A. F. TRIPP.

Coal Box and Fire Iron Holder.

No. 9,267. Reissued June 29, 1880.

Witnesses:
Chas. J. Buchheit
Edw. J. Brady

A. F. Tripp Inventor.
By Wilhelm & Bonnell
Attorneys.

N. PETERS, PHOTO-LITHOGRAPHER, WASHINGTON, D. C.

UNITED STATES PATENT OFFICE.

AUGUSTUS F. TRIPP, OF BUFFALO, NEW YORK.

COAL-BOX AND FIRE-IRON HOLDER.

SPECIFICATION forming part of Reissued Letters Patent No. 9,267, dated June 29, 1880.

Original No. 134,230, dated December 24, 1872. Application for reissue filed April 27, 1880.

*To all whom it may concern:*

Be it known that I, AUGUSTUS F. TRIPP, of the city of Buffalo, in the county of Erie and State of New York, have invented a Combined Coal-Box and Fire-Iron Holder, of which the following is a specification, reference being had to the accompanying drawings.

The invention consists, first, of a coal-box provided with a receptacle or compartment at one of its sides (preferably at the back) of sufficient size to receive and hold a shovel, tongs, and poker, whereby the use of a separate stand for the purpose is dispensed with, and the soiled lower portions of the fire-irons are concealed from view and the dust and cinders which adhere thereto prevented from soiling the floor or carpet, and hooks or curved arms which receive the upper ends of the fire-irons and hold the same in a proper upright position; also, in the particular arrangement of the hooks or curved arms, whereby each of the fire-irons is held separate from the other in its proper place, as will be hereinafter move fully set forth.

Figure 1:
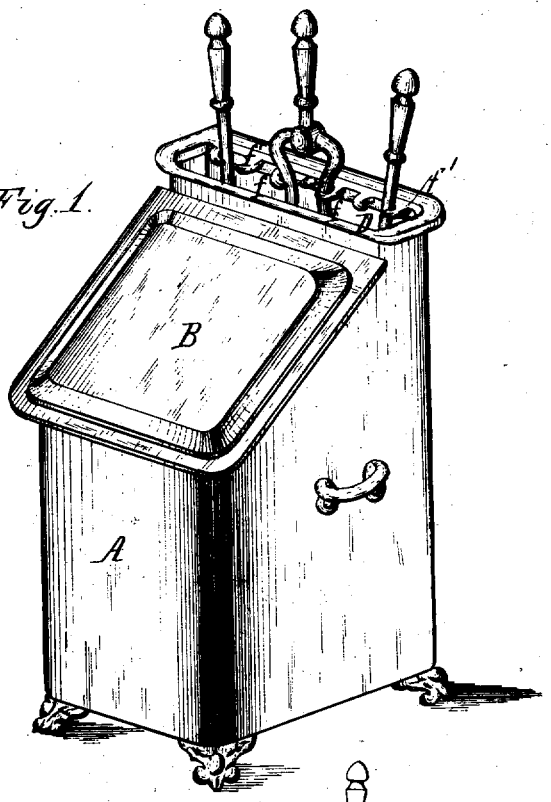
Figure 2:
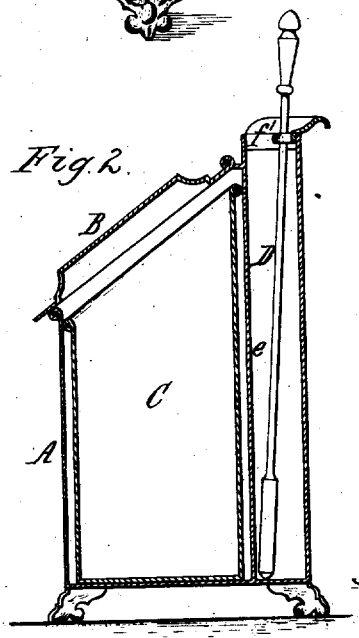

In the accompanying drawings, Figure 1 is a perspective view of my improved coal-box. Fig. 2 is a vertical section thereof.

Like letters of reference designate like parts in both of the figures.

A represents the coal-box; B, the cover thereof; C, the removable vessel or hod, which fits in said compartment in the ordinary manner and contains the coal. D is the receptacle or compartment for the fire-irons, arranged preferably at the back of the coal-box A, and separated from it by a vertical partition, *e*. *f f* are two hooks or curved arms attached to the upper edge of the back side of the receptacle D, on each side of the center thereof, at a sufficient distance apart to receive the legs of the tongs between them; and *f′ f′* are two hooks arranged on either side of the hooks *f f*, for receiving the handles of the shovel and poker, as shown in the drawings.

I prefer to make the receptacle D of about the same height as the rest of the box, so that when the fire-irons are placed therein only the upper and usually ornamented portions of the handles will project above the box in a convenient position, while the lower portions of the irons are concealed in the receptacle D, which also retains any cinders that may have adhered to the irons after using the same.

I claim as my invention—

1. A coal-box provided on one of its sides with an upright compartment which holds and conceals the lower portions of the fire-irons, and suitable hooks or curved arms which receive and hold the upper ends of the fire-irons, substantially as set forth.

2. The combination of the hooks or curved arms *f f′* with the receptacle D of the coal-box and holder for fire-irons, as hereinbefore set forth.

AUGUSTUS F. TRIPP.

Witnesses:

EDWARD WILHELM,

EDWARD J. BRADY.